United States Patent
Stephens, Jr.

(10) Patent No.: US 10,489,945 B2
(45) Date of Patent: Nov. 26, 2019

(54) GRAPHICAL USER INTERFACE COMPONENT TO TRANSPOSE A HISTOGRAM

(71) Applicant: EMC IP Holding Company LLC, Hopkinton, MA (US)

(72) Inventor: Frederick Dwight Stephens, Jr., Broomfield, CO (US)

(73) Assignee: EMC IP Holding Company LLC, Hopkinton, MA (US)

(*) Notice: Subject to any disclaimer, the term of this patent is extended or adjusted under 35 U.S.C. 154(b) by 44 days.

(21) Appl. No.: 15/887,298

(22) Filed: Feb. 2, 2018

(65) Prior Publication Data

US 2019/0244401 A1 Aug. 8, 2019

(51) Int. Cl.
*G06T 11/20* (2006.01)
*G06F 3/0485* (2013.01)

(52) U.S. Cl.
CPC .......... *G06T 11/206* (2013.01); *G06F 3/0485* (2013.01)

(58) Field of Classification Search
CPC .................................................. G06T 11/206
USPC .......................................................... 345/440
See application file for complete search history.

(56) References Cited

U.S. PATENT DOCUMENTS

| | | | | |
|---|---|---|---|---|
| 6,750,649 B1* | 6/2004 | Rosenfeld | ............ | G01R 33/446 324/307 |
| 2003/0049009 A1* | 3/2003 | Vaganov | ................ | G02B 6/266 385/140 |
| 2005/0088441 A1* | 4/2005 | Hao | ....................... | G06T 11/206 345/440 |
| 2008/0133982 A1* | 6/2008 | Rawlins | ................ | H03F 1/0211 714/699 |
| 2009/0063557 A1* | 3/2009 | MacPherson | ............ | G06N 5/02 |
| 2009/0261936 A1* | 10/2009 | Widjaja | .............. | H01F 17/0006 336/200 |
| 2010/0041562 A1* | 2/2010 | Li | ........................ | B01J 19/0046 506/9 |
| 2012/0063628 A1* | 3/2012 | Rizzello | ................... | H04R 1/26 381/355 |
| 2015/0123678 A1* | 5/2015 | Neikirk | .................. | G01N 27/08 324/636 |
| 2018/0114347 A1* | 4/2018 | Mittelstadt | ....... | G06Q 10/06395 |

OTHER PUBLICATIONS

"Golden Ratio, the Phi, and Its Geometrical Substantiation" year 2011 IEEE, Amir A. Shafie et al.*
"An Application of 3D Spiral Visualization to the Uchida-Kraepelin Psychodiagnostic Test", year 2014 IEEE, Zhuang Heliang et al.*

* cited by examiner

*Primary Examiner* — Javid A Amini
(74) *Attorney, Agent, or Firm* — Staniford Tomita LLP

(57) ABSTRACT

A histogram of values recorded during time units in a time period is represented by dividing the time period into a set of time segments, each time segment thereby being associated with a subset of histogram bins. A graph is displayed that includes drawing an expanding spiral according to a golden ratio spiral, and defining a set of quarter circles using the expanding spiral, each quarter circle having an edge formed by a portion of the expanding spiral, and a center. Drawn within a quarter circle is a set of sectors about the center of the quarter circle. The quarter circle represents a time segment and the set of sectors represent time units.

20 Claims, 14 Drawing Sheets

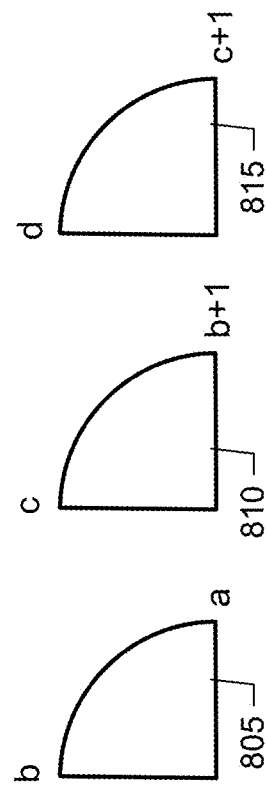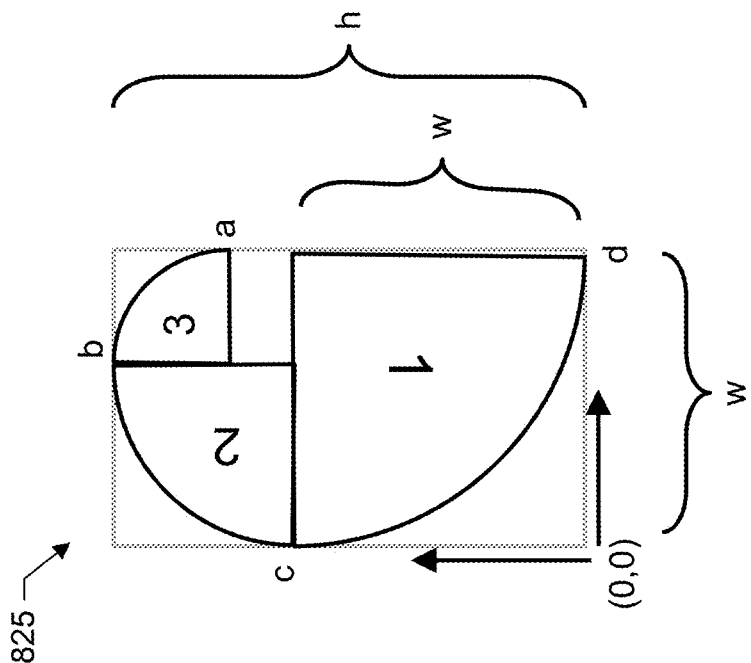
FIG. 8

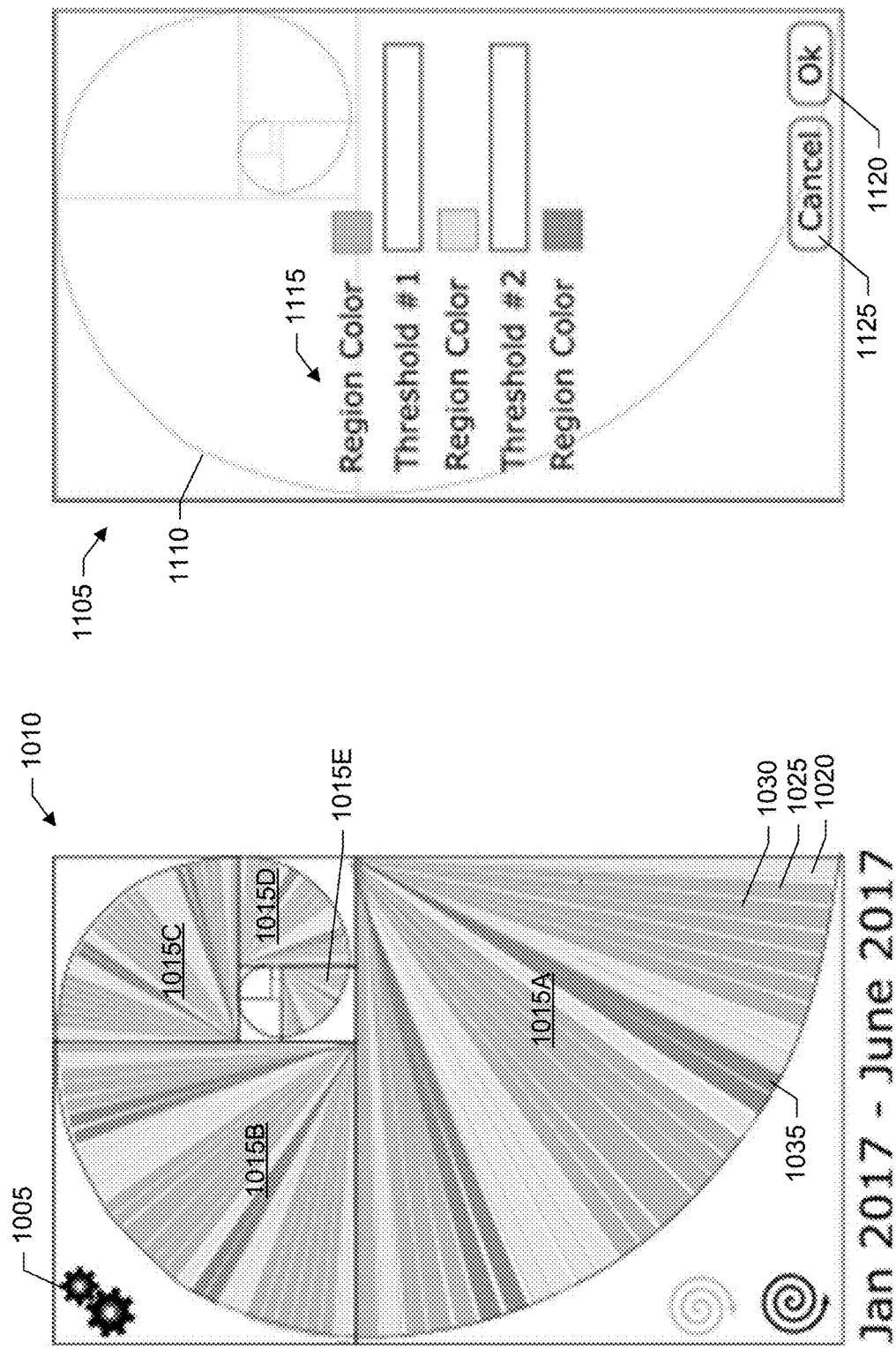

GRAPHICAL USER INTERFACE COMPONENT TO TRANSPOSE A HISTOGRAM

TECHNICAL FIELD

The present invention relates generally to the field of computer user interfaces, and, more particularly, to a graphical computer user interface component for improving the visualization of information.

BACKGROUND

A graphical user interface (GUI) is a type of user interface that allows users to interact with electronic devices through graphical icons and visual indicators, instead of text-based user interfaces, typed command labels, or text navigation. GUIs are often found as the front-end to many different types of software programs, applications, and operating systems.

GUIs often employ graphs or charts. Graphs help to illustrate the meaning of data, the relationship between different pieces of information, trends, and so forth. There are many different types of graphs such as line graphs, bar charts, pie charts, spider charts, and scatter plots, among many others.

A histogram is a type of graph having rectangles or bins extending vertically from a horizontal axis and whose area is proportional to the frequency of a variable and whose width is equal to the class interval. A histogram, however, can consume a large amount of screen real estate. Histograms can be very inefficient in their use of screen real estate. Previous efforts to condense the histogram dataset into other data visualizations have resulted in a lack fidelity, require the user to repeatedly drill into many different levels to see detail, or both.

There continues to be a need for improved software and graphical user interfaces. It is desirable to have interfaces that are easy to use, allow users to visualize their data better or faster, allow users to visualize their data in different ways, and, in particular, provide a visually rich and compact data presentation with the ability to reveal high fidelity data as the user desires.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE FIGURES

In the following drawings like reference numerals designate like structural elements. Although the figures depict various examples, the one or more embodiments and implementations described herein are not limited to the examples depicted in the figures.

FIG. 8 shows a schematic of a second step for transforming the histogram into the golden log.

FIG. 10 shows a front view of the golden log.

FIG. 11 shows a back view of the golden log.

FIG. 12 shows a flow for scrolling the golden log out or in.

DETAILED DESCRIPTION

Figure 1:
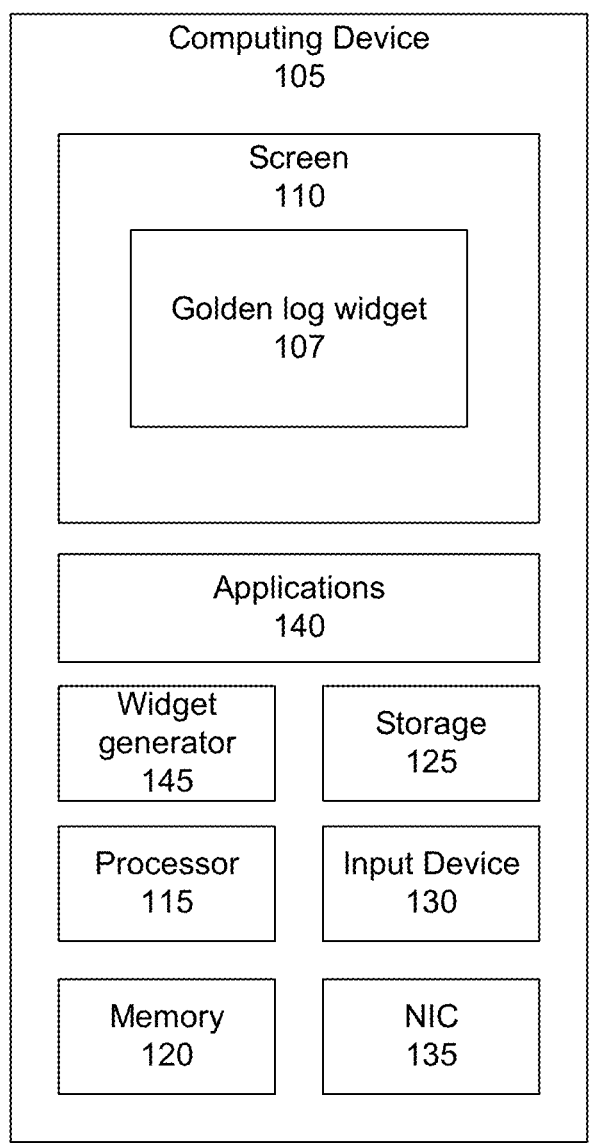
FIG. 1 a block diagram of a computer system used to provide a user interface having a golden log widget, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network.

Disclosed herein are methods and systems for generating a graph, chart, or diagram that may be referred to as a golden log widget or golden log. The golden log widget provides a visually rich and compact data presentation with the ability to reveal high fidelity data when desired.

FIG. 1 shows a block diagram of a computing device 105 in which a specific embodiment of a golden log widget 107 may be implemented. The computing device may be a general purpose computer with hardware and software such as an electronic screen 110, processor 115, memory 120, storage 125, input device 130, network interface card or controller 135, and application programs 140. The device may further include a battery as a power source depending on the type of device (e.g., portable or mobile computing device). Some specific examples of computing devices include desktop computers, laptop computers, tablet computers, mobile communication devices, smartphones, and so forth. Some specific examples of application programs include browsers (e.g., Google Chrome, Microsoft Internet Explorer, or Apple Safari), electronic spreadsheet program (e.g., Microsoft Excel), business software, productivity software, enterprise software, backup and data protection programs, asset management applications, and many others.

The computing device executes executable code (or computer-readable code) that embodies a technique or algorithm as described herein. More particularly, there is a widget generator 145 that is responsible for generating the golden log widget. The golden log widget is a graphical user interface (GUI) element which may be displayed on the computer screen. A widget includes a control element in a GUI through which the user can interact.

The widget generator may be implemented as an add-in, plug-in, script, macro, library, extension program, or stand-alone application program. The widget generator may be implemented using cloud computing, where users access the generator through the cloud. The generator can be updated in the cloud, and delivered to users through, for example, their web browsers, so users do not need to manually update widget generator software on their system. The code of the widget generator may be embedded with the content (e.g., document or Web page) that is transmitted from a server to the client computing device. For example, the code can be embedded in the Web page document. Whenever a user accesses a Web page, the executable code is delivered to that user. In other implementations, the code may be sent or downloaded separately from the Web page. For example, code can be downloaded as a plug-in that resides on the user's device, and the Web page invokes this plug-in.

The widget generator may be embodied as a hardware component provided as part of the computing device as a programmable logic circuit, such as a field-programmable gate array (FPGA), application-specific integrated circuit (ASIC), or other similar hardware module. Alternatively, it may be embodied as a program executed by processors and processing hardware of the computing device. It may also be embodied as firmware integrating aspects of both hardware and software (executable program) elements residing in or executed by processors and circuitry of the computing device. In yet a further embodiment, the widget generator may be partially or wholly executed by or integrated within one or more other servers of a system (e.g., client-server system or architecture). It may also be partially or wholly embodied as a server-side, client-side, or distributed (server-client) component or process within one or more processor-based elements.

The widget generator is responsible for generating a graphical representation of a dataset. The graphical representation may be referred to as a golden log widget, golden log, graph, or chart. In a specific embodiment, the dataset is associated with a histogram of values recorded during time units over a time period. The widget generator may generate the golden log by transposing the histogram of values.

Figure 2:
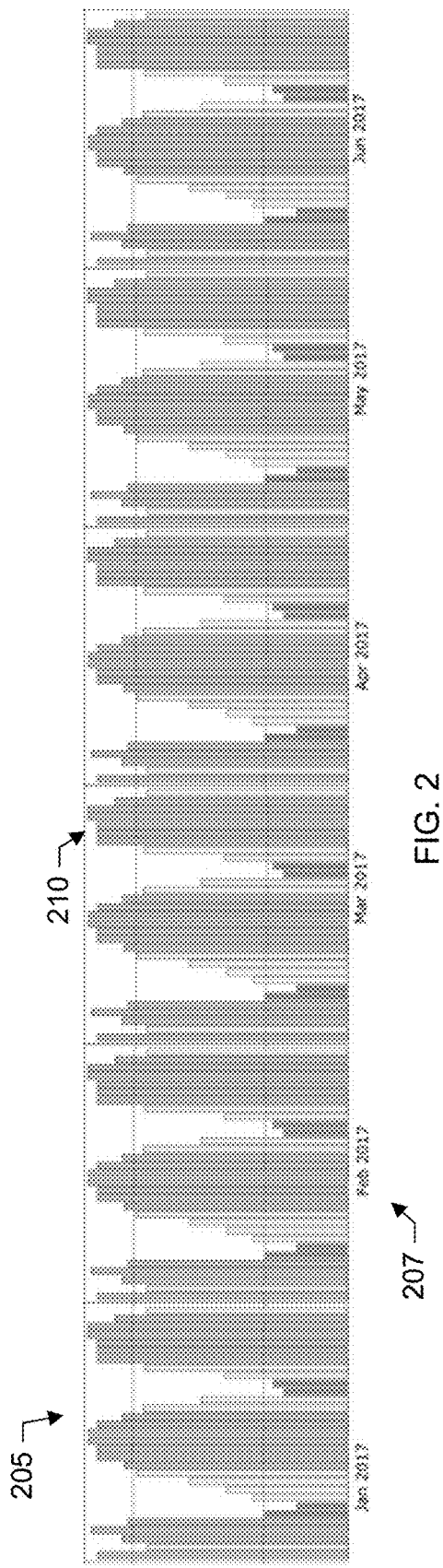
FIG. 2 shows an example of a histogram.

FIG. 2 shows an example of a histogram 205. A histogram provides a linear representation of the distribution of numerical data. It is an estimate of the probability distribution of a continuous variable (quantitative variable). To construct a histogram, a first step may be to "bin" the range of values—that is, divide the entire range of values into a series of intervals—and then count how many values fall into each interval. The bins are usually specified as consecutive, non-overlapping intervals of a variable. The bins (intervals) are generally adjacent, and are often (but are not required to be) of equal size.

A rectangle may be erected over the bin with a height or length proportional to the frequency—the number of cases in each bin. However, bins need not be of equal width; in that case, the erected rectangle is defined to have its area proportional to the frequency of cases in the bin. The vertical axis is then not the frequency but frequency density—the number of cases per unit of the variable on the horizontal axis. As the adjacent bins leave no gaps, the rectangles of a histogram touch each other to indicate that the original variable is continuous.

Histograms can provide a rough sense of the density of the underlying distribution of the data, and often for density estimation: estimating the probability density function of the underlying variable. The total area of a histogram used for probability density may be normalized to 1. If the length of the intervals on the x-axis are all 1, then a histogram is identical to a relative frequency plot. Histograms are similar to bar charts. A histogram, however, is used for continuous data, where the bins represent ranges of data, while a bar chart is a plot of categorical variables.

The histogram shown in the example of FIG. 2 is of values recorded during time units over a period of time. In this example, a duration of a time unit is a day and a duration of the period of time extends from about January 2017 to about June 2017. Thus, in the example shown in FIG. 2, the time period has been segmented into months 207, bins 210 correspond to days, and a height of a bin is proportional to a count of the values recorded on a corresponding day. It should be appreciated, however, that other embodiments may use different types of time units, different time periods, or both (e.g., seconds, minutes, hours, days, weeks, months, years, and so forth). The time units, time periods, and time segments of the time periods can be user-configurable so that a user can define time units, time periods, and time segments to be of any arbitrary length, measurement of or duration of time.

The histogram representation can occupy a very large amount of screen real estate. The large amount of occupied real estate is especially problematic for mobile and portable computing devices such as smartphones and tablet computers. Attempts to condense the visualization to better fit the limited amount of space on a screen have resulted in a loss of fidelity, a cumbersome user experience, or both.

Figure 3:
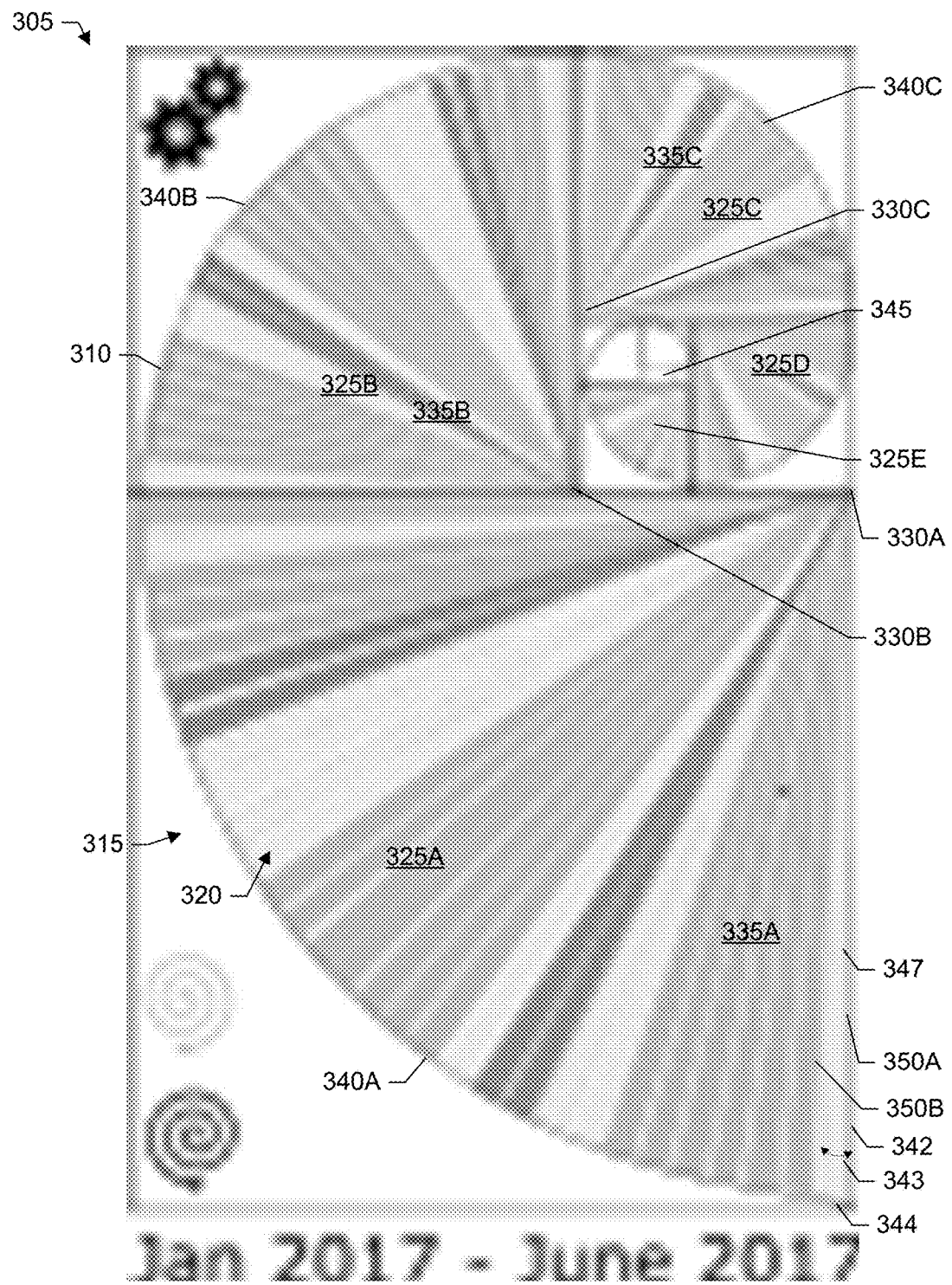
FIG. 3 shows an example of the histogram having been transposed or collapsed into a golden log.
Figure 4:
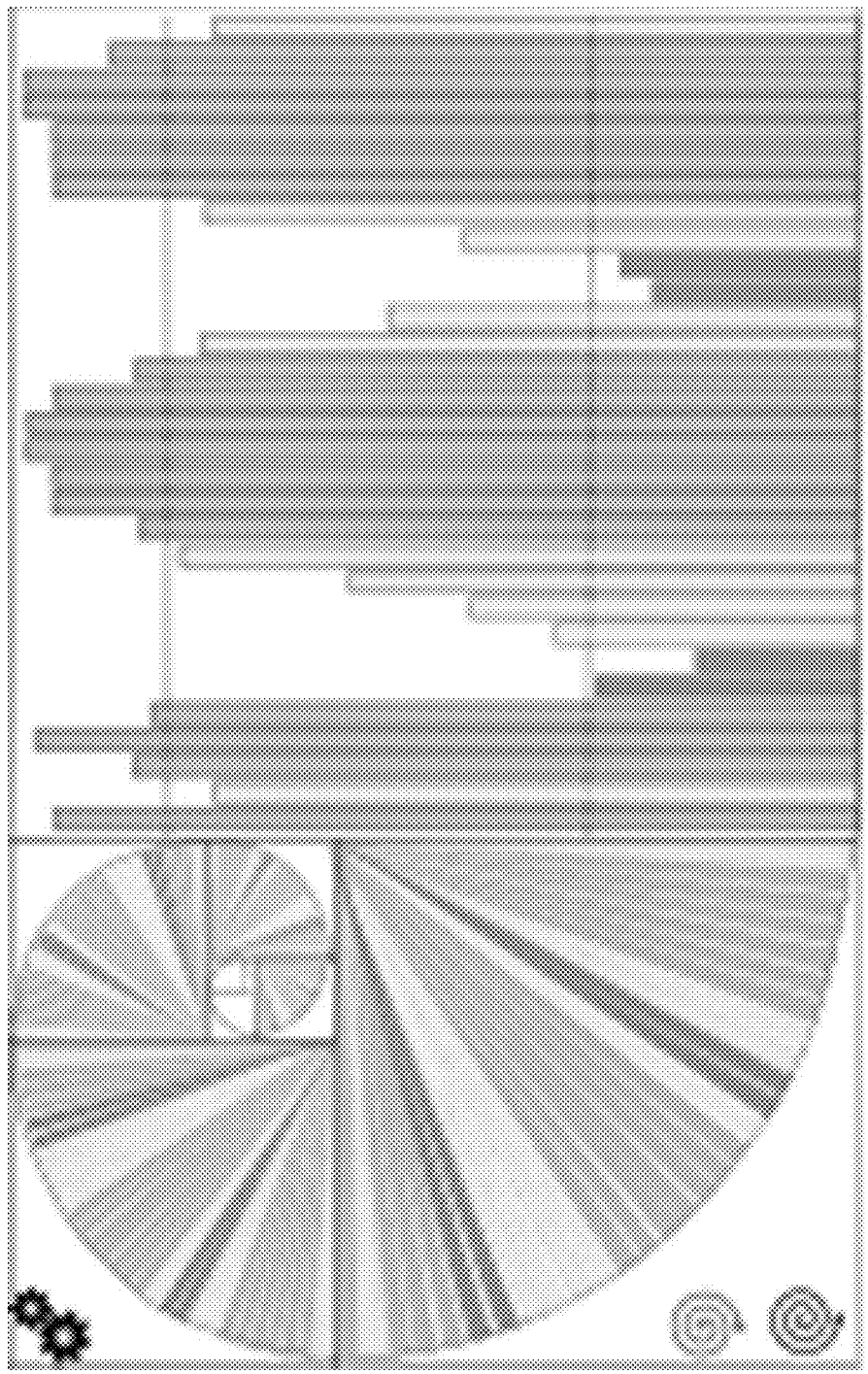
FIG. 4 shows an example of a segment of the golden log having been expanded.

In a specific embodiment, systems and techniques are provided to turn the large detailed histogram graph into a compact form (see, e.g., FIG. 3) while providing the ability to easily reveal full details when required (see, e.g., FIG. 4). Specifically, FIG. 3 shows an example of the histogram shown in FIG. 2 being transposed into a widget 305 that may be referred to as a golden log widget. The golden log includes a graph having an expanding spiral 310, a set of quarter circles 315, and a set of sectors 320 distributed about centers of the quarter circles. The quarter circles include edges, rims, or arcs formed by portions of the expanding spiral. The expanding spiral may be constructed as a logarithmic spiral line segment or set of expanding whorls. In a specific embodiment, the expanding spiral is drawn according to or approximating a golden ratio spiral. That is, the spiral has a growth factor of q=1.6180339887, i.e., the golden ratio.

More particularly, as shown in the example of FIG. 3, there is a first quarter circle 325A. The first quarter circle includes a first center 330A and a first set of sectors 335A extending from the first center to a first portion 340A of the expanding spiral. A sector is that portion of the quarter circle that is enclosed by two radii and an arc. The first set of sectors have the same shape and height or length as each other sector in the first set of sectors (e.g., are of uniform shape and height or length). In other words, a radius 342 of a sector 347 in the first set of sectors is equal to a radius of each other sector in the first set of sectors. A central angle 343 of a sector in the first set of sectors is equal to a central angle of each other sector in the first set of sectors. An arc 344 of a sector in the first set of sectors is equal to an arc of each other sector in the first set of sectors.

There is a second quarter circle 325B, adjacent to and drawn in a clockwise direction from or with respect to the first quarter circle. The second quarter circle includes a second center 330B and a second set of sectors 335B extending from the second center to a second portion 340B of the expanding spiral. The second set of sectors have the same shape and height or length as each other sector in the second set of sectors. In other words, a radius of a sector in the second set of sectors is equal to a radius of each other sector in the second set of sectors. A central angle of a sector in the second set of sectors is equal to a central angle of each other sector in the second set of sectors. An arc of a sector in the second set of sectors is equal to an arc of each other sector in the second set of sectors.

There is a third quarter circle 325C, adjacent to and drawn in a clockwise direction from or with respect to the second quarter circle. The third quarter circle includes a third center 330C and a third set of sectors 335C extending from the third center to a third portion 340C of the expanding spiral. The third set of sectors have the same shape and height or length as each other sector in the third set of sectors. In other words, a radius of a sector in the third set of sectors is equal to a radius of each other sector in the third set of sectors. A central angle of a sector in the third set of sectors is equal to a central angle of each other sector in the third set of sectors. An arc of a sector in the third set of sectors is equal to an arc of each other sector in the third set of sectors.

The remaining quarter circles are similarly constructed and drawn. The quarter circles originate from a point 345 and spiral outwards in a counter-clockwise direction progressively increasing in size. In a specific embodiment, the quarter circles represent consecutive time segments of the histogram, the sectors represent bins of the histogram, and the progressively increasing sizes of the quarter circles from the origination point represent a progression forwards through the time period of the histogram. Conversely, the progressively decreasing sizes of the quarter circles clockwise towards the origination point represent a progression backwards through the time period.

Thus, for example, a size of the first quarter circle is shown as being greater than sizes of the second quarter circle, third quarter circle, and so forth. This indicates that a first time segment represented by the first quarter circle (e.g., June 2017) occurs after or is more recent than a second time segment (e.g., May 2017) represented by the second quarter circle and a third time segment (e.g., April 2017) represented by the third quarter circle, and so forth.

A size of the second quarter circle is shown being greater than a size of the third quarter circle and less than a size of the first quarter circle. This indicates that the second time segment represented by the second quarter circle occurs after or is more recent than the third time segment represented by the third quarter circle, and also that the second time segment occurs before the first time segment, and so forth.

It should be appreciated, however, that the ordering or arrangement of the quarter circles may be reversed so that the progressively increasing sizes of the quarter circles represent a progression backwards through the time period and the progressively decreasing sizes of the quarter circles represent a progression forwards through the time period.

The sectors represent the bins of the histogram and thus the individual time units (e.g., days). For example, a first sector 350A in the first quarter circle represents a first bin/time unit from the first time segment, a second sector 350B in the first quarter circle immediately before and adjacent to the first sector represents a second bin/time unit from the first time segment, and so forth. A sector may be referred to as a wedge or pie-shaped wedge.

In a specific embodiment, the sectors are color-coded to indicate whether counts of the values corresponding to the time units represented by the sectors are above (or below) threshold counts or a range of threshold counts. For example, a sector representing a time unit may be shown using a first color when a count of values recorded during the time unit exceeds a threshold value. The sector may be shown using a second color, different from the first color, when the count falls below the threshold value.

In a specific embodiment, the length or height of a sector is scaled to 100 percent irrespective of the count of values falling within a time unit corresponding to the sector. For example, generally, a bin of a histogram has a height proportional to a count of values falling within a time unit corresponding to the bin. In this specific embodiment, however, a sector of the golden log representing the bin has a height or length (e.g., radius) that is not proportional to the count of the values. Rather, the height of the sector is scaled to 100 percent. Scaling the height of the sector to 100 percent helps to improve the readability of the golden log—especially when going backwards through time and through progressively smaller quarter circles. In another embodiment, however, a sector may be configured to have a height proportional to a count of values recorded during a time unit corresponding to the sector.

In a specific embodiment, the sectors within a quarter circle are uniform or are of the same size, shape, and thickness. For example, a central angle of a sector in a quarter circle may be equal to a central angle of each other sector in the quarter circle. In another specific embodiment, the sectors within the quarter circle may not be uniform.

Figure 5:
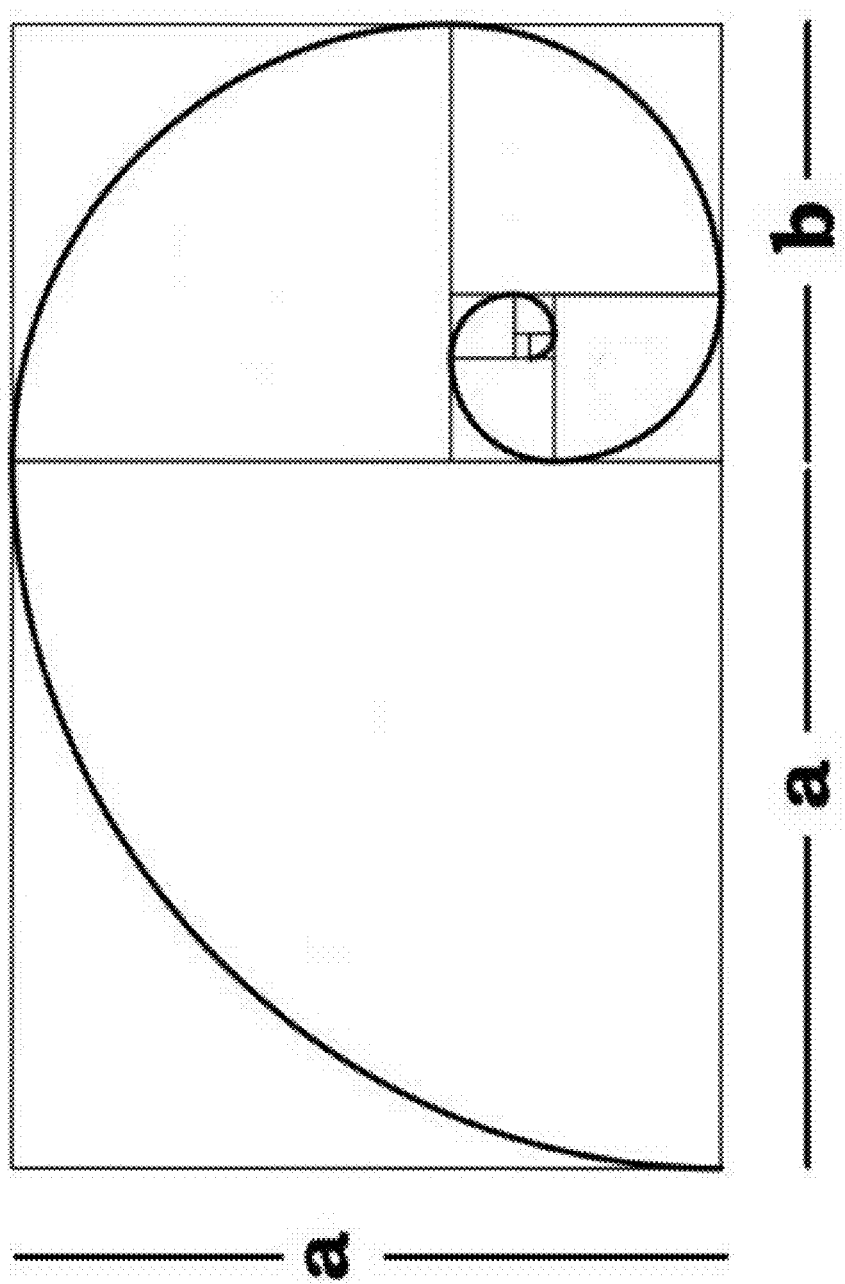
FIG. 5 shows an example of a golden spiral drawn within a series of conjoint rectangles.

FIG. 5 shows an example of the expanding spiral fitting within an ongoing series of conjoint rectangles that are progressively subdivided into smaller and smaller rectangles. These rectangles may be referred to as golden rectangles. The radius of the spiral, at any given point, is the length of the corresponding square to a golden rectangle. More particularly, as shown in the example of FIG. 5, the relationship may be expressed as $(a+b)/a=a/b=1.61803$.

Each rectangle may include a long side and a short side. A ratio of the long side to the short side is about 1.61803. A first quarter circle having a largest size is drawn within a first square formed from dividing a first rectangle. A second quarter circle having a next largest size is drawn within a second square formed from dividing a second rectangle. A side of the first square is equal to a radius of the first quarter circle and a short side of the first rectangle. A side of the second square is equal to a radius of the second quarter circle and a short side of the second rectangle. The first quarter circle represents a first time segment. The second quarter circle represents a second time segment occurring immediately before the first time segment. In other words, the first time segment occurs immediately after the second time segment. The first time segment is more recent than the second time segment.

In a specific embodiment, based in part on the mathematics that describe the "golden ratio", the nautilus shell, and other progressive growth structures found in nature, the golden log widget is designed to show a great deal of data with reasonable fidelity within a limited amount of space with the greatest level of detail provided to the most recent data. The term "golden" in "golden log" is in reference to an application of the "golden ratio."

Each "segment" of data is expressed over a quarter circle inscribed within a square region. As data segments move back through time, the segments are scaled, rotated and positioned as described by the mathematics of the golden ratio. Solving the data presentation for one segment solves the presentation for all when combined with scaling, rotation, and translation. In a specific embodiment, segment boundaries are intentionally shown in the widget to provide strong visual cues where segments begin and end.

In a specific embodiment, as part of the process of transposing data from a "traditional" graphical log presentation into the segments, data is also "normalized" to be of equivalent "length" while maintaining the color dictated by threshold settings in the data visualization settings provided by the widget.

Other representations including symmetrical spirals with a common center point can cause a loss of focus on boundaries and may draw one's attention towards the center of the widget rather than seeing the data as a series of segments over intervals.

Figure 6A:
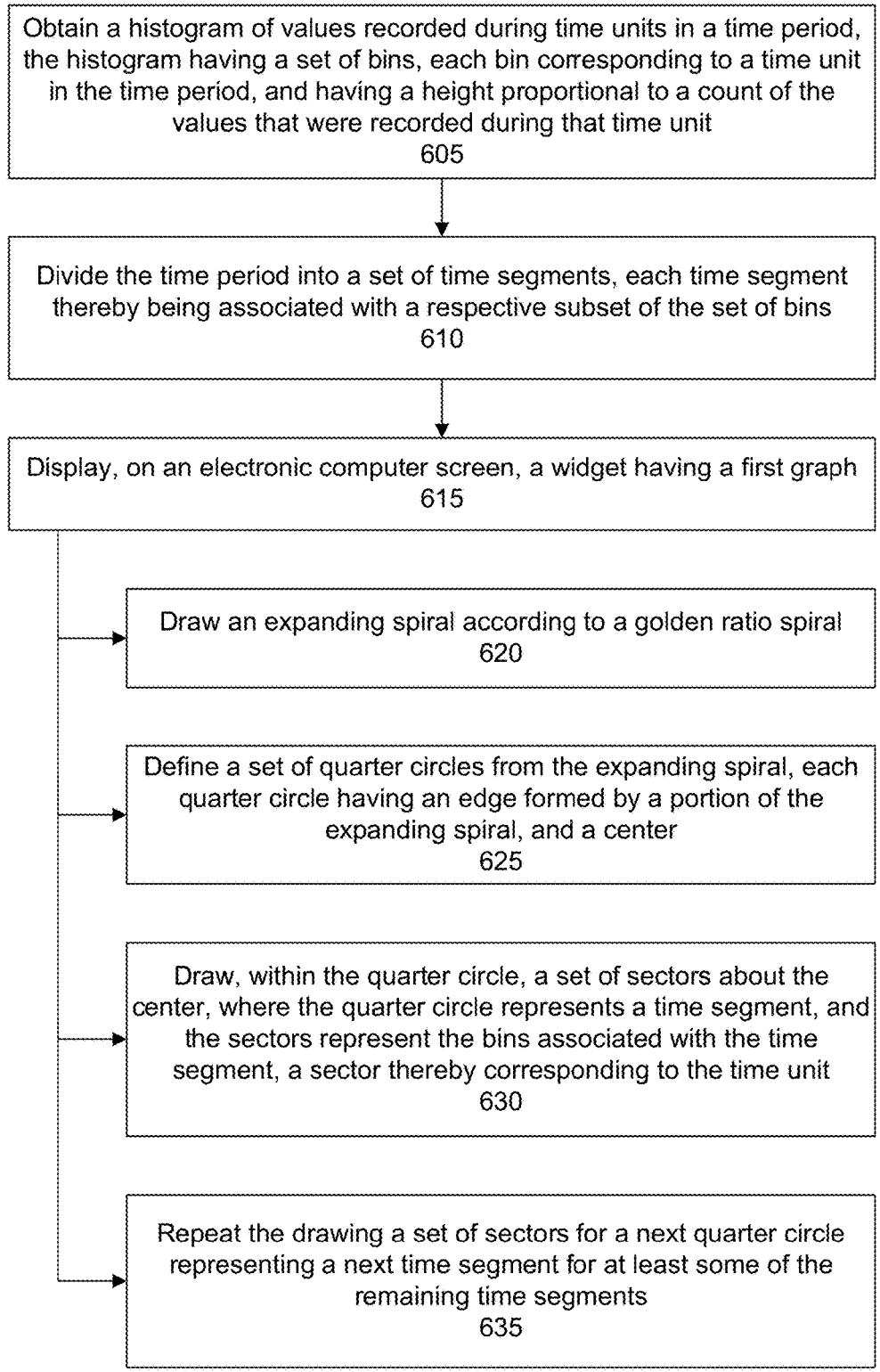
FIG. 6A shows an overall flow for generating a golden log widget according to one or more embodiments.

FIG. 6A shows an overall flow for generating a golden log widget. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 605, a dataset associated with a histogram is obtained. The histogram (or dataset) may include values recorded during time units in a time period. The histogram may include a set of bins, each bin corresponding to a time unit in the time period, and having a height proportional to a count of the values that were recorded during that time unit.

In a step 610, the time period is divided into a set of time segments, each time segment thereby being associated with a respective subset of bins (e.g., time units). Durations of the time segments may be the same or approximately the same. The time segments may be consecutive. In a step 615, a widget having a first graph is displayed on an electronic computer screen. Generating the first graph may include drawing an expanding spiral according to a golden ratio spiral (step 620); defining a set of quarter circles from the expanding spiral, each quarter circle having an edge formed by a portion of the expanding spiral, and a center (step 625); drawing, within the quarter circle, a set of sectors about the center, where the quarter circle represents a time segment, and the sectors represent the bins associated with the time segment, a sector thereby corresponding to the time unit (step 630); and, repeating the drawing a set of sectors for a next quarter circle representing a next time segment for at least some of the remaining time segments (step 635).

More particularly, in a specific embodiment, there are two principal morphisms that occur to support the golden log widget presentation. The first is transforming a range (or interval) of data from the traditional histogram dataset into a corresponding golden log widget segment. The second is the scaling, translation and rotation of the segment to follow the curve, size, and orientation described by the golden ratio for segment placement.

Figure 6B:
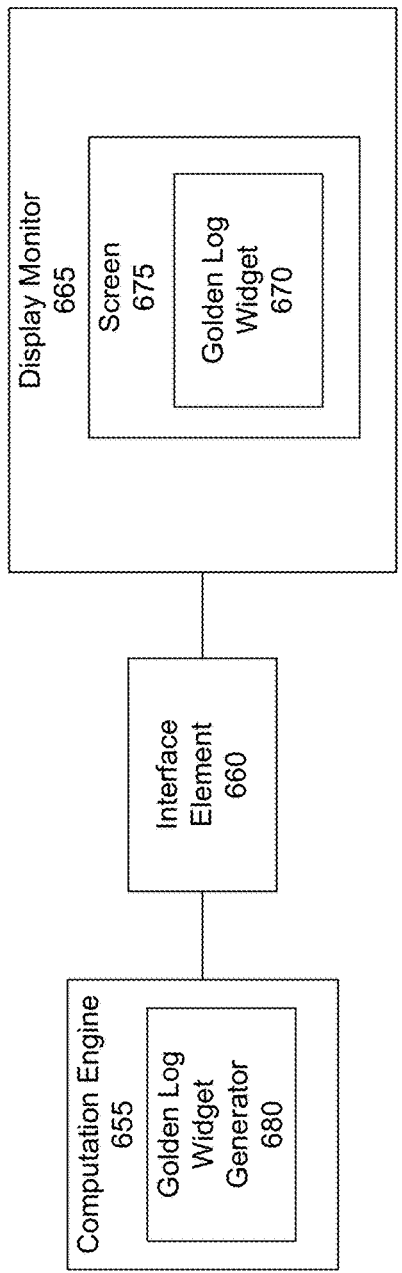
FIG. 6B shows a block diagram of a system to draw a golden log widget on a screen according to one or more embodiments.

FIG. 6B shows a simplified block diagram according to one or more embodiments of a computation engine (e.g., hardware processor) 655 communicating with an interface element 660 which in turn is communicating with a display monitor 665 in which data is being transformed in one unit and causing a golden log widget or graph 670 to display in a screen 675 of the display monitor. The computation engine executes code of a golden log widget generator 680 to display the golden log widget or graph on the screen.

Table A below shows a flow of substeps for step 1 of the transformation.

TABLE A

| Step | Description |
|---|---|
| A | Select a range which represents a region of the linear histogram to be mapped to a Golden Log Widget segment |

TABLE A-continued

| Step | Description |
|---|---|
| B | Perform a coordinate transformation to map the linear range to a quarter circle segment range |
| C | Perform data element transformation<br>Normalization<br>    Each data element is visually represented by the same amplitude.<br>    Color is be used to indicate amplitude range (range defined within each widget parameters).<br>    Note: Underlying data values are maintained to allow for mouse-over effects and inverse transformation.<br>    Vertical Bar to wedge transformation |

Figure 7:
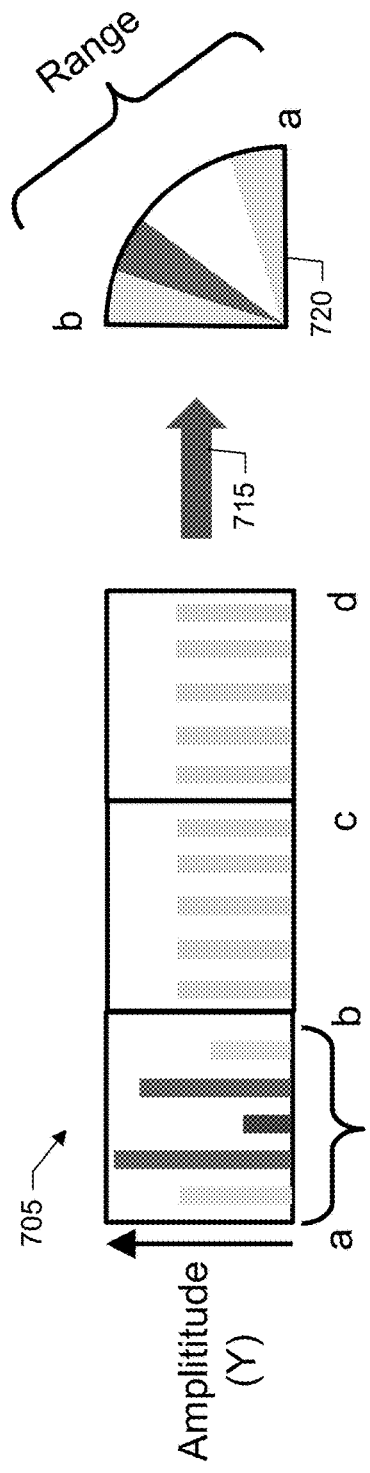
FIG. 7 shows a schematic of a first step for transforming a histogram into a golden log.

FIG. 7 shows a graphical representation of step 1 of the transformation. As shown in the example of FIG. 7, there is a histogram 705. A range (X) 710 is selected which represents a region of the linear histogram to be mapped 715 to a golden log widget segment (e.g., quarter circle) 720.

A coordinate transformation is performed to map the linear range to a quarter circle segment range. In a specific embodiment, the D3 javascript library is used to draw an arc segment. Inputs include the inner and outer radius and starting and ending angles. (Note: the D3 library draws in a clockwise direction and uses 2*pi to represent a circle rather than degrees so the calculated parameters below take those implementation details into account.) Table B below shows the calculations associated with the D3 library.

TABLE B

| | |
|---|---|
| A = 90/number of data values per segment | (represents angle step) |
| $D_i$ = Data element index | (0 based, resets for each segment) |
| $I_r$ = 0 | (Inner radius) |
| $O_r$ = 1 | (Outer radius, representing a normalized amplitude) |
| $S_a$ = Math.PI/2 − ((A*($D_i$ + 1)/90) * Math.PI/2) | (starting angle) |
| $E_a$ = Math.PI/2 − ((A*$D_i$/90) * Math.PI/2) | (ending angle) |
| . . . repeat for each data element calculating a new starting and ending angle | |
| var arc = d3.body.arc( ).innerRadius($I_r$).outerRadius($O_r$).startingAngle($S_a$).endAngle($E_a$) | |

As discussed, step 2 of the transformation includes scaling, rotating, and translating the previously calculated segment into the correct location as described by the golden ratio. FIG. 8 shows an approximate visualization of the scaling, translation, and rotation of three quarter circle segments 805, 810, and 815 into a widget 825.

Given a widget height of "h", using the golden ratio conjugate "K" (~0.618) the width of the widget can be established by multiplying the height by the ratio. The width is also the radius of the inscribed quarter circle used for the segment. Using the coordinate system shown in FIG. 8, the position of the first segment would be (0,0). The first segment would be scaled by the golden ratio conjugate and rotated 180 degrees.

From the above, scaling, rotation, and translation of any segment can be generalized as shown in Table C below.

TABLE C

| | | |
|---|---|---|
| Rotation | =modulo((Segment number + 1) * 90, 360) | Seg 1: 180, Seg 2: 270, Seg 3: 0, Seg 4: 90 |
| Scaling ratio | =(golden ratio conjugate) ^ $^{Segment\ number}$ | Seg 1: 0.618, Seg 2: 0.382, Seg 3: 0.236 |

TABLE C-continued

| | | |
|---|---|---|
| X-Coordinates | =0, 0, w*K, w − w*K^3, w − ((w − w*K^3) + (w*K^4)), [ ], [ ] + w*K^6 | Seg 1-7, where [ ] references previous value |
| Y-Coordinates | =0, h*K, h − h*K^3, h − ((h − h*K^3) + (h*K^4)), [ ], [ ] + h*K^6, [ ] | Seg 1-7, where [ ] references previous value |

Figure 9:
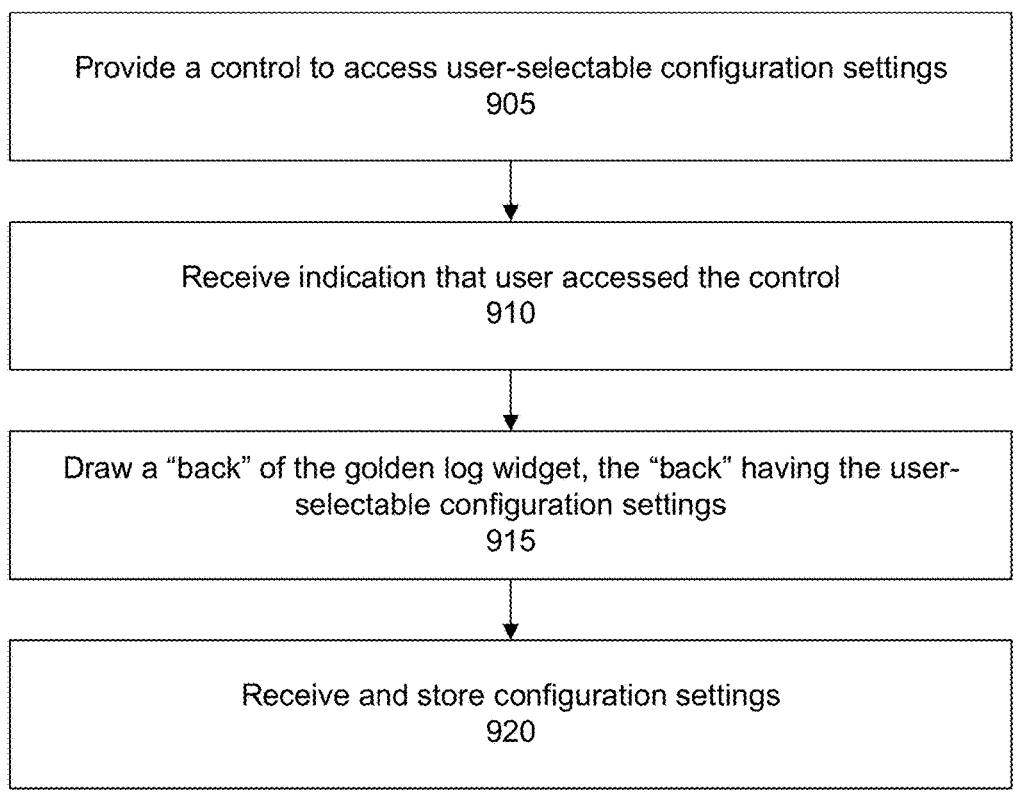
FIG. 9 shows a flow for configuring threshold colors of the golden log.

FIG. 9 shows a flow for configuring the threshold colors of the golden log widget. In a step 905, a visual control is provided to access user-selectable configuration settings. In a step 910, an indication is received that the user accessed or selected the control. In a step 915, the user is presented with the user-selectable configuration settings. In a specific embodiment, the user-selectable configuration settings are shown as being on a "back" of the golden log widget. In a step 920, the configuration settings are received and stored.

More particularly, FIG. 10 shows a clickable button or icon 1005 of a golden log widget 1010 to access threshold configuration attributes. This example of the golden log includes five segments or time segments as represented by quarter circles 1015A, 1015B, 1015C, 1015D, and 1015E.

Upon the user selecting button 1005, a "back" 1105 (FIG. 11) of the widget is revealed. As shown in the example of FIG. 11, the back of the widget includes a light stylized/watermark 1110 of the spiral that is maintained on the "back" of widget. The "back" of the widget includes a set of user-selectable configuration settings or threshold configuration attributes 1115 to allow the user to configure the threshold colors and boundary values.

A boundary value may be referred to as a threshold value, threshold count, or threshold frequency. A boundary value may be defined using a single value, range of values, relational operators (e.g., "less than," "greater than," "less than or equal to," "greater than or equal to," and so forth), or combinations of these. For example, the user may input a first threshold value and specify that a sector or region of the segment be shown using a first color (e.g., green) when a count of values recorded during a time unit corresponding to the sector is less than the first threshold value. As another example, the user may specify that the sector be shown using a second color (e.g., yellow), different from the first color when the count is greater than the first threshold value. As another example, the user may input a second threshold value and specify that a sector or region of the segment be shown using a third color (e.g., red) when a count of values recorded during a time unit corresponding to the sector is greater than the second threshold value.

As another example, the user may define a threshold range including a lower limit of the range, an upper limit of the range, and specify that a sector be shown using a fourth color (e.g., orange) when the count of values is between the lower and upper limits of the threshold range. As another example, the user may specify that a sector be shown using a fifth color (e.g., blue) when the count of values is outside the lower and upper limits of the threshold range. And so forth.

For example, in FIG. 10, there is shown quarter circle 1015A that may correspond to a first time segment (e.g., June 2017). Quarter circle 1015A includes a first sector 1020, a second sector 1025, a third sector 1030, and so forth. The second sector is next to the first sector and between the first and third sectors. The third sector is next to the second sector. The sectors may correspond to consecutive units of time in the first time segment. For example, the first sector may correspond to Jun. 30, 2017; the second sector may correspond to Jun. 29, 2017; the third sector may correspond to Jun. 28, 2017; and so forth. The first sector may be shown using a first color (e.g., yellow) to indicate that a number of values logged during Jun. 30, 2017, is between a first range having a first lower limit and a first upper limit. The second and third sectors may be shown using a second color (e.g., green) to indicate that a number of values logged during Jun. 29, 2017 and Jun. 28, 2017, respectively, is outside the first range and below the first lower limit. A fourth sector 1035, corresponding to Jun. 21, 2017, may be shown using a third color (e.g., red) to indicate that a number of values logged during Jun. 21, 2017 is outside the first range and above the first upper limit.

Further, the number of segments or time segments to be shown in the golden log widget is configurable. The number of segments shown for a widget may range from about 5-10, with the upper bound mostly based on the overall widget size. The number of segments shown may be less than 5 or greater than 10. The number of elements or sectors within a segment is also principally bounded by scale, but may range from about 1-40. The number of sectors shown within a segment may be greater than 40. The number of segments to show, number of sectors within a segment to show, or both may depend on factors such as screen size, screen resolution, number of data points, and other factors.

The user can save the configuration settings by clicking an "Ok" button 1120 or cancel the selections by clicking a "Cancel" button 1125. It should be appreciated that there can be any type or combinations of types of visual controls such as input boxes, drop down lists (e.g., drop down list of colors), radio buttons, and the like.

Figure 12:
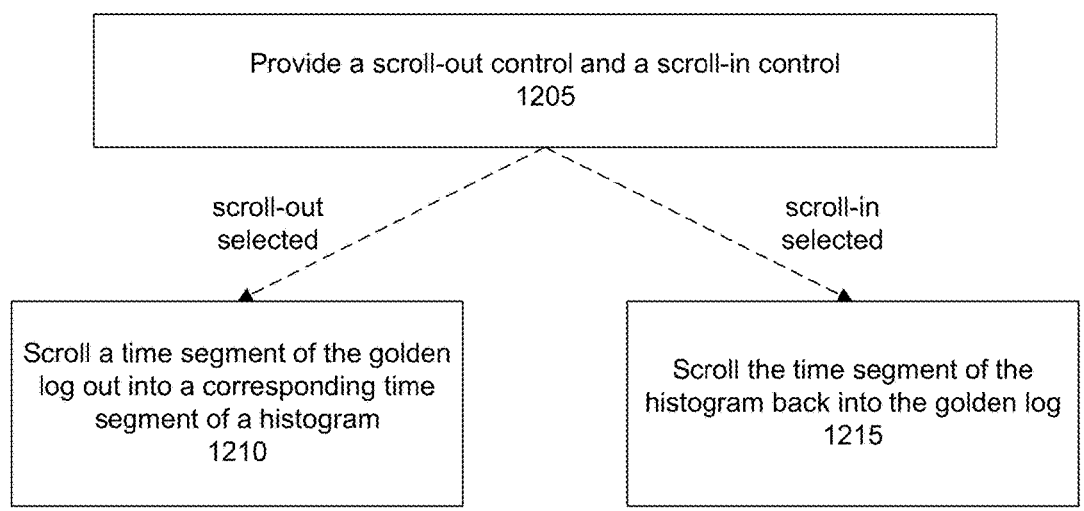

FIG. 12 shows a flow for scrolling the golden log out into a linear graph (e.g., histogram) or scrolling the linear graph or histogram back into the golden log. In a step 1205, scroll-out and scroll-in visual controls are provided for the user to select. When the user selects the scroll-out control, a time segment of the golden log is scrolled out into a corresponding time segment of a histogram (step 1210).

Figure 14:
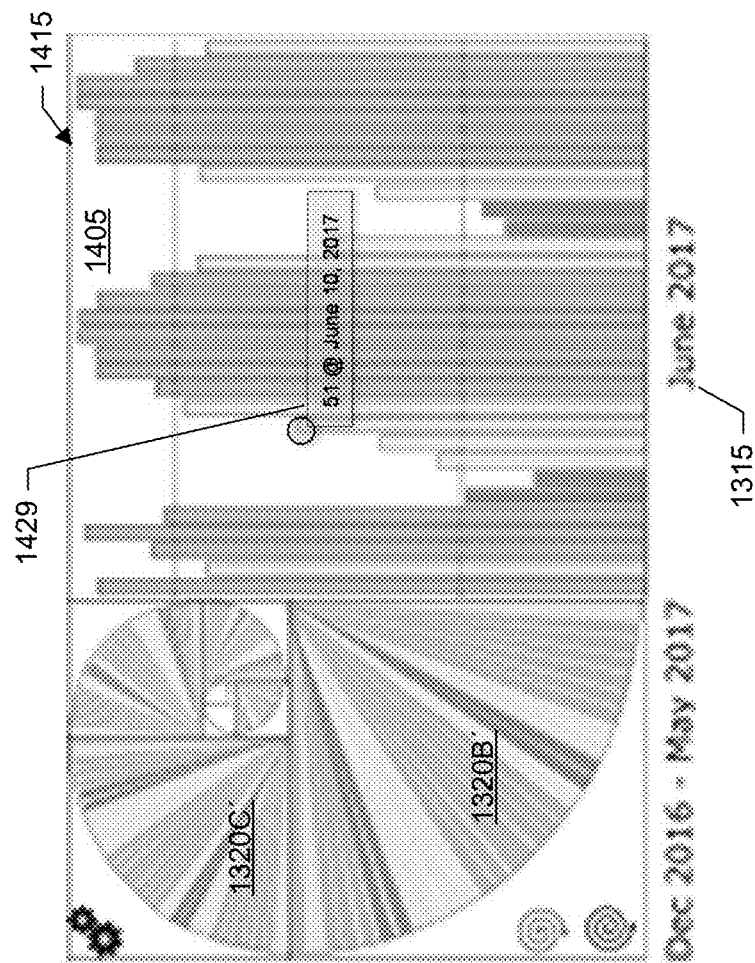
FIG. 14 shows the golden log widget in a second state, after the first state.
Figure 13:
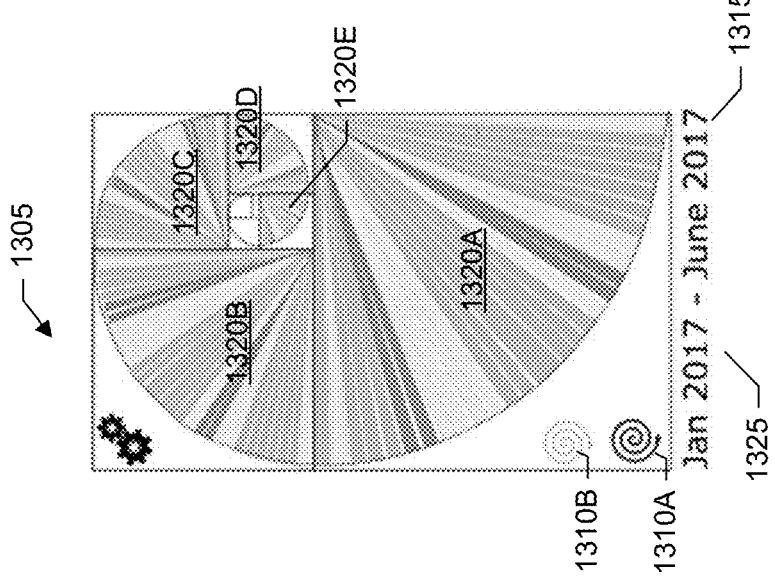
FIG. 13 shows a golden log widget in a first state.

In particular, FIG. 13 shows an example of a golden log 1305 in a first state. The golden log includes a scroll-out control 1310A, and a scroll-in control 1310B. FIG. 14 shows an example of the golden log in a second state, after the user has clicked the scroll-out control. In FIG. 14, a details panel 1405 is shown adjacent to the golden log. The details panel is showing another graph that may be referred to as a linear graph or histogram. Specifically, a most recent segment or time segment 1315 (FIG. 13) currently shown in the golden log is scrolled out into a corresponding linear graph 1415 or histogram (FIG. 14); and the golden log is updated to include representations of time segments occurring before the time segment now being shown in linear graph or histogram form.

For example, in FIG. 13, five time segments are shown in the golden log as represented by five quarter circles 1320A-E. These quarter circles correspond to June 2017-February 2017, respectively. The most recent time segment shown in the golden log is June 2017 and thus quarter circle 1320A has the largest size. A label 1325 provides a range of data within the golden log widget.

When the scroll-out control is selected, the most recent segment shown in the golden log—the quarter circle having the largest size, e.g., June 2017—is pulled out from the golden log and shown in its corresponding linear graph or histogram form 1415 (FIG. 14). In other words, quarter circle 1320A corresponding to June 2017 is shown in histogram form 1415 in which heights of the histogram bins are now drawn to reflect the number of values recorded during the time units corresponding to the bins.

The golden log is correspondingly updated or shifted to include representations of time segments before the time segment currently being shown in linear graph or histogram form. In other words, as shown in the example of FIG. 14, the golden log now shows quarter circle 1320B' corresponding to the time segment May 2017 with the biggest size, followed by quarter circle 1320C' (April 2017), and so forth.

The visual effect of selecting the scroll-out control may be analogous to a measuring tape being unwound where the unwound portion of the measuring tape is the linear graph and the wound up portion of the measuring tape are the remaining segments.

Referring back now to FIG. 12, when the scroll-in control is selected, the time segment of the histogram (or linear graph) is scrolled back into the golden log. In other words, in this example, the golden log widget reverts from the second state as shown in FIG. 14 to the first state as shown in FIG. 13. The visual effect of selecting the scroll-in control may be analogous to the measuring tape being wound up.

Thus, the scrolling controls move data segments in and out of the details panel. FIG. 13 shows "scroll in" functionality disabled and "scroll out" functionality enabled. In a specific embodiment, scroll in/out functionality can be disabled if the user wishes to constrain the widget to overview mode only. If disabled, these controls are not visible.

When data is contained within the widget dataset the "scroll out" feature is enabled. When clicked, a single segment is "scrolled" into a more traditional linear graph view revealing the full details of the data. The linear graph is added as an overlay which will occlude anything beneath.

A single segment of data is revealed in the linear graph segment for each click of the "scroll out" feature. In a specific embodiment, only one segment of data is shown in the linear graph segment at a time. As data is scrolled out of the golden log widget, new data (if available) is moved into the "oldest" segment. If no additional data is available, the oldest segment is shown as empty.

For example, in a specific embodiment, a golden log widget includes first, second, and third quarter circles. The first quarter circle represents a first time segment. The second quarter circle represents a second time segment, occurring before the first time segment. The third quarter circle represents a third time segment, occurring before the second and first time segments. A size of the first quarter circle is greater than sizes of the second and third quarter circles. A size of the second quarter circle is greater than a size of the third quarter circle. In other words, the first quarter circle represents the most recent time segment, followed by the second quarter circle, followed by the third quarter circle.

A scrolling out of the golden log includes displaying a first portion of a histogram corresponding to the first time segment and shifting the time segments represented by the quarter circles one time segment forward. In other words, after an initial scroll out is selected, the first quarter circle will represent the second time segment. The second quarter circle will represent the third time segment. The third quarter circle will represent a fourth time segment, occurring before the third, second, and first time segments. A next scrolling out of the golden log includes displaying a second portion of the histogram corresponding to the second time segment. The first portion of the histogram corresponding to the first time segment is not displayed. After the next scrolling out is selected, the first quarter circle will represent the third time segment. The second quarter circle will represent the fourth time segment. The third quarter circle will represent a fifth time segment, occurring before the fourth, third, second, and first time segments.

Scroll-out is enabled as long as there is any data remaining in the golden log widget. When all data has been scrolled out, the scroll out feature is disabled.

After any data has been scrolled out, the "scroll in" feature is enabled. This allows data to be returned to the golden log widget. When all data is scrolled into the golden log widget, the linear segment (e.g., linear graph or histogram) is removed. Clicking anywhere outside of the widget boundaries will cause the view to be returned to the initial view without the linear segment. The labels for the golden log widget and the linear segment are updated with the correct ranges and values as data is scrolled in and out.

The scroll-out and scroll-in controls allow the user to expand the segments of the golden log into a more detailed view and collapse the detailed views back into a condensed format and the golden log. In an embodiment, selecting the scroll-out control "shifts" the time segments of the golden log forward such that the most recent time segment (and thus largest sized quarter circle) of the golden log is expanded into a linear graph format. Selecting the scroll-in control "collapses" the time segment shown in the linear graph format back into the golden log and "shifts" the segments backwards.

In a specific embodiment, a method includes: displaying a window on an electronic screen; displaying, within a first pane of the window, a first graph comprising: a progressively expanding spiral and progressively expanding quarter circles drawn inside a series of conjoint rectangles; a plurality of sectors drawn within the quarter circles, wherein the quarter circles represent consecutive time segments over a time period, and a sector represents a time unit in a time segment, wherein the sector is colored based on a count of values recorded during the time unit, and the sectors of a quarter circle have uniform lengths, and wherein the progressively expanding quarter circles represent a progression forwards the time period, a quarter circle having a largest size thereby representing a most recent time segment in the first graph; when a user selects a scroll-out control, extending, into a second pane of the window adjacent to the first pane, the most recent time segment in the first graph as a second graph, the second graph comprising: a plurality of vertical bins, the plurality of vertical bins representing time units from the most recent time segment, each vertical bin having a height proportional to a count of values recorded during a time unit represented by a vertical bin, and a color based on the count of the values recorded during the time unit; and updating the first graph with quarter circles representing time segments occurring before the most recent time segment now being represented by the second graph; and when the user selects a scroll-in control, retracting, from the second pane, the most recent time segment represented by the second graph back into a quarter circle of the first graph; and updating the first graph with quarter circles representing time segments occurring before the most recent time segment.

Referring now to FIG. 14, in a specific embodiment, mouse-over labels 1429 of the linear graph are activated when the user hovers their pointing device over a bin. The mouse-over label provides additional detail for the bin such as an identification of a time unit corresponding to the bin (e.g., Jun. 10, 2017) and a count of values recorded during the time unit (e.g., 51). The colors or other visible indicators of threshold values may be maintained between the golden log graph and linear graph.

The golden log widget is visually distinctive, can represent a great deal of data with reasonable fidelity to allow for very rapid visual inspection all within a small footprint while retaining the ability to reveal the full fidelity of the data when required. The implementation of the widget could support responsive UI guidelines through scaling and reducing or increasing segments based on available screen size. In a specific embodiment, the golden log widget is primarily designed with discrete datasets in mind. In a specific embodiment, the widget strongly relies on color discrimination (or other visible indications) for threshold values therefore the ability to configure the color palette for each threshold region has been provided to accommodate personal preferences and color impairment concerns.

Because of the large datasets supported by the widget, examples of possible use cases include displaying daily data over a period of six months or more segmented by months, displaying hourly data over a period of a week segmented by days, and many others.

Figure 15:
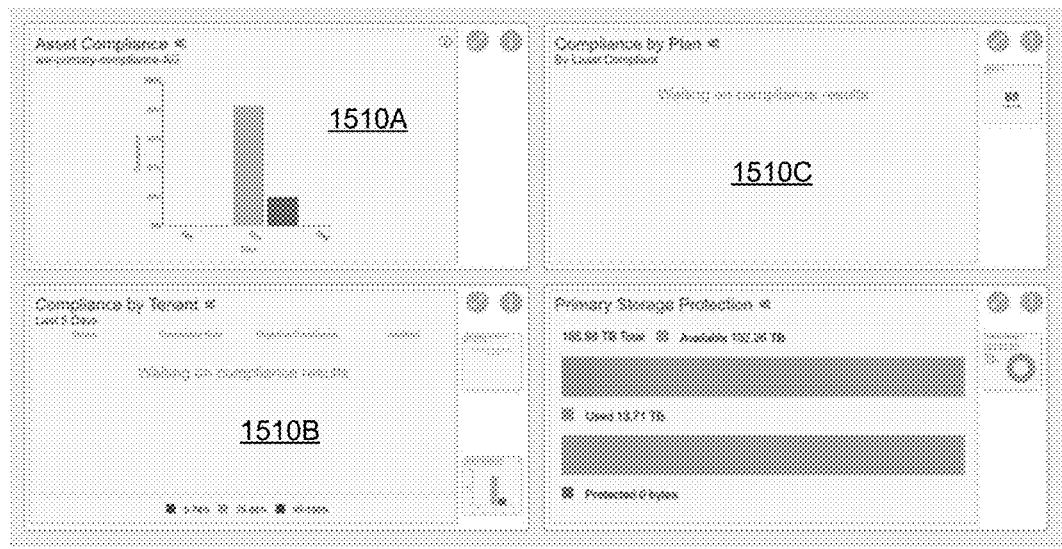
FIG. 15 shows a view of a dashboard user interface.
Figure 16:
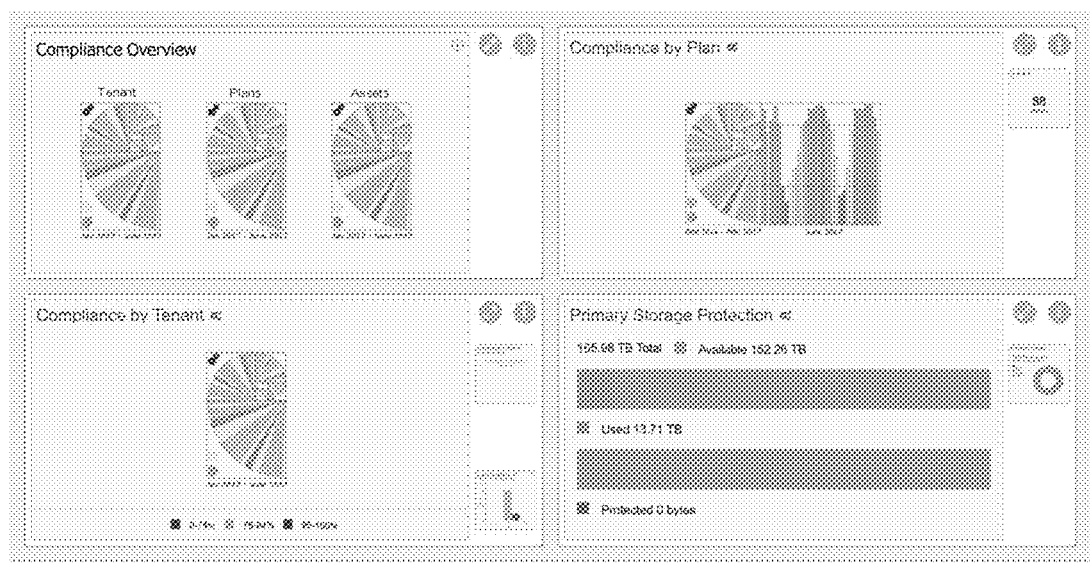
FIG. 16 shows a view of another dashboard user interface.

FIG. 15 shows a dashboard 1505. In this dashboard view, three panels 1510A-C (¾ of the available screen display area) are used to show different aspects of compliance over an interval of 8 days. FIG. 16 shows another dashboard 1605 having golden log widgets. Alternatively, as shown in FIG. 16, a single panel could be used to show all three aspects of compliance, or each panel could show 6 months of compliance data for each compliance type.

Figure 17:
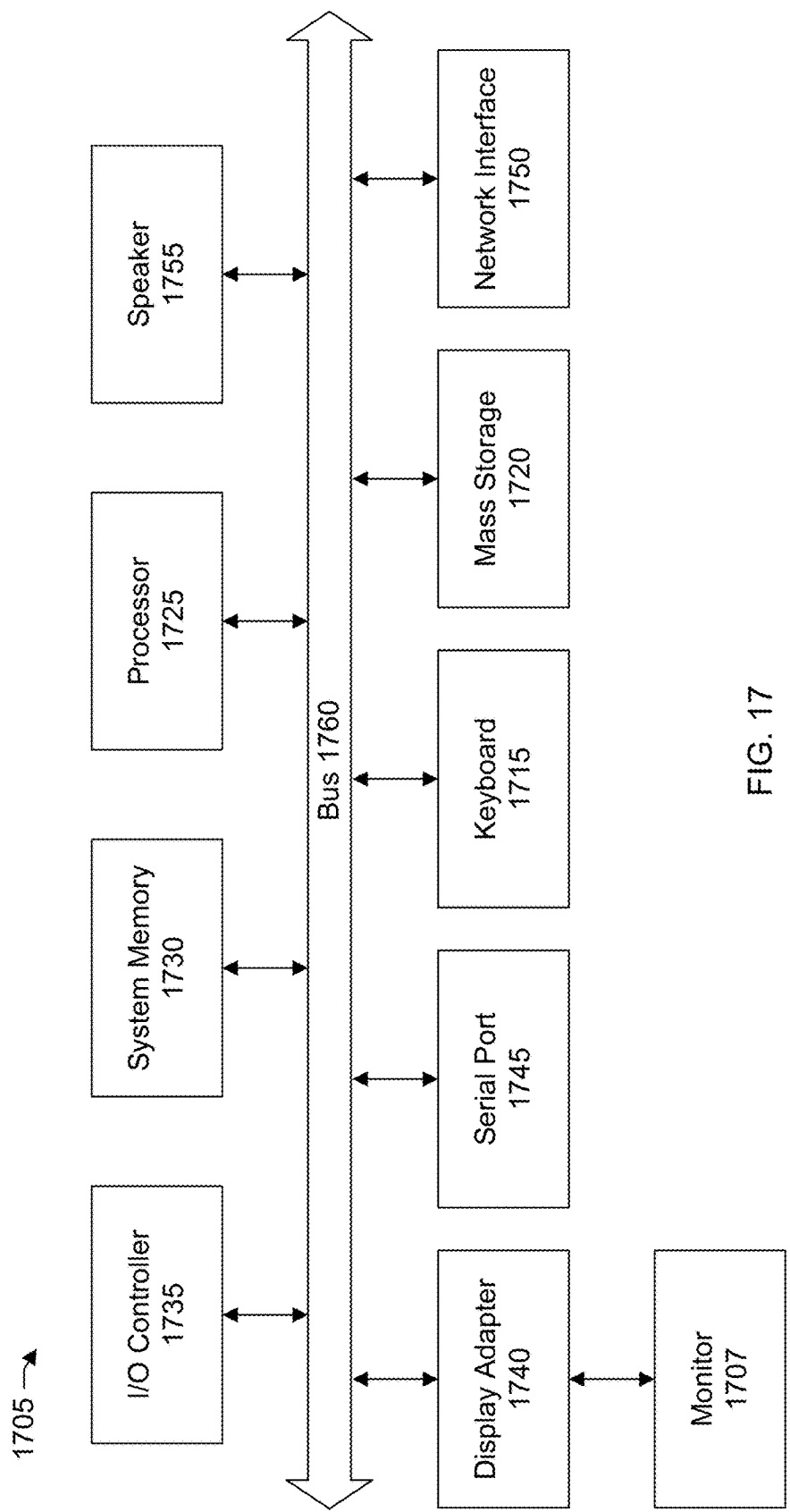
FIG. 17 shows a block diagram of a computer system suitable for use with the system, under some embodiments.

FIG. 17 shows a system block diagram of a computer system 1705 used to execute the software of the present system described herein. The computer system includes a monitor 1707, keyboard 1715, and mass storage devices 1720. Computer system 1705 further includes subsystems such as central processor 1725, system memory 1730, input/output (I/O) controller 1735, display adapter 1740, serial or universal serial bus (USB) port 1745, network interface 1750, and speaker 1755. The system may also be used with computer systems with additional or fewer subsystems. For example, a computer system could include more than one processor 1725 (i.e., a multiprocessor system) or a system may include a cache memory.

Arrows such as 1760 represent the system bus architecture of computer system 1705. However, these arrows are illustrative of any interconnection scheme serving to link the subsystems. For example, speaker 1755 could be connected to the other subsystems through a port or have an internal direct connection to central processor 1725. The processor may include multiple processors or a multicore processor, which may permit parallel processing of information. Computer system 1705 shown in FIG. 17 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In a specific embodiment, a method of representing a histogram of values recorded during time units in a time period, the histogram having a plurality of bins, each bin corresponding to a time unit, and having a height proportional to a count of the values recorded during that time unit, the method comprising: dividing the time period into a plurality of time segments, each time segment thereby being associated with a respective subset of the plurality of bins; and displaying, on a computer screen, a first graph comprising: drawing an expanding spiral according to a golden ratio spiral; defining a plurality of quarter circles using the expanding spiral, each quarter circle having an edge formed by a portion of the expanding spiral, and a center; drawing, within a quarter circle, a plurality of sectors about the center, wherein the quarter circle represents a time segment, and the plurality of sectors within the quarter circle represent a plurality of bins associated with the time segment and thereby time units in the time segment; and repeating the drawing a plurality of sectors for a next quarter circle representing a next time segment for at least some remaining time segments.

The method may include providing, on the computer screen, a scroll-out control for a user to scroll the first graph out; and after the scroll-out control is selected, shifting time segments represented by the quarter circles in the first graph forwards by displaying in a second graph, adjacent to the first graph, a first portion of the histogram, wherein the first portion of the histogram corresponds to a first time segment, wherein prior to the scroll-out control being selected, the first time segment had been represented by a quarter circle having a size greater than all other quarter circles in the first graph, and wherein after the scroll-out control is selected, a second time segment occurring immediately before the first time segment is represented by the quarter circle having the size greater than all the other quarter circles in the first graph.

The method may include providing, on the computer screen, a scroll-in control for the user to scroll the first graph in; and after the scroll-in control is selected, shifting the time segments represented by the quarter circles in the first graph backwards by collapsing the first portion of the histogram in the second graph back into the first graph, wherein after the scroll-in control is selected, the first time segment is represented by the quarter circle having the size greater than all other quarter circles in the first graph, and the second time segment is represented by a quarter circle having a size one size smaller than the quarter circle representing the first time segment.

In an embodiment, each sector of a particular quarter circle comprises a radius that extends from a center to an edge of the particular quarter circle, each sector of the particular quarter circle thereby having a uniform length irrespective of a count of values recorded during a time unit represented by a sector of the particular quarter circle.

In an embodiment, each sector of a particular quarter circle comprises a central angle equal to a central angle of each other sector in the particular quarter circle.

The method may include assigning a first color to a threshold count of values; for each sector, determining whether a count of values recorded during a time unit represented by a sector exceeds the threshold count; if the count exceeds the threshold count, showing the sector using the first color; and if the count does not exceed the threshold count, showing the sector using a second color, different from the first color.

In an embodiment, increasing sizes of the quarter circles indicate a progression forwards through the time period.

In another specific embodiment, there is a system for representing a histogram of values recorded during time units in a time period, the histogram having a plurality of bins, each bin corresponding to a time unit, and having a height proportional to a count of the values recorded during that time unit, the system comprising: a processor-based system executed on a computer system and configured to: divide the time period into a plurality of time segments, each time segment thereby being associated with a respective subset of the plurality of bins; and display, on a computer screen, a first graph comprising: drawing an expanding spiral according to a golden ratio spiral; defining a plurality of quarter circles using the expanding spiral, each quarter circle having an edge formed by a portion of the expanding spiral, and a center; drawing, within a quarter circle, a plurality of sectors about the center, wherein the quarter circle represents a time segment, and the plurality of sectors within the quarter circle represent a plurality of bins associated with the time segment and thereby time units in the time segment; and repeating the drawing a plurality of sectors for a next quarter circle representing a next time segment for at least some remaining time segments.

In another specific embodiment, there is a computer program product, comprising a non-transitory computer-readable medium having a computer-readable program code embodied therein, the computer-readable program code adapted to be executed by one or more processors to implement a method comprising: dividing the time period into a plurality of time segments, each time segment thereby being associated with a respective subset of the plurality of bins; and displaying, on a computer screen, a first graph comprising: drawing an expanding spiral according to a golden ratio spiral; defining a plurality of quarter circles using the expanding spiral, each quarter circle having an edge formed by a portion of the expanding spiral, and a center; drawing, within a quarter circle, a plurality of sectors about the center, wherein the quarter circle represents a time segment, and the plurality of sectors within the quarter circle represent a plurality of bins associated with the time segment and thereby time units in the time segment; and repeating the drawing a plurality of sectors for a next quarter circle representing a next time segment for at least some remaining time segments.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method of representing a histogram comprising:
obtaining values used for the histogram, the values having been recorded during time units in a time period, the histogram comprising a plurality of bins, each bin corresponding to a time unit, and having a height proportional to a count of the values recorded during that time unit;
dividing the time period into a plurality of time segments, each time segment thereby being associated with a respective subset of the plurality of bins; and
displaying, on a graphical user interface of a computer screen, a first graph comprising:
drawing an expanding spiral according to a golden ratio spiral;
defining a plurality of quarter circles using the expanding spiral, each quarter circle having an edge formed by a portion of the expanding spiral, and a center;
drawing, within a quarter circle, a plurality of sectors about the center, wherein the quarter circle represents a time segment, and the plurality of sectors within the quarter circle represent a plurality of bins associated with the time segment and thereby time units in the time segment; and
repeating the drawing a plurality of sectors for a next quarter circle representing a next time segment for at least some remaining time segments.

2. The method of claim 1 comprising:
providing, on the computer screen, a scroll-out control for a user to scroll the first graph out; and
after the scroll-out control is selected, shifting time segments represented by the quarter circles in the first graph forwards by displaying in a second graph, adjacent to the first graph, a first portion of the histogram,
wherein the first portion of the histogram corresponds to a first time segment,
wherein prior to the scroll-out control being selected, the first time segment had been represented by a quarter circle having a size greater than all other quarter circles in the first graph, and
wherein after the scroll-out control is selected, a second time segment occurring immediately before the first time segment is represented by the quarter circle having the size greater than all the other quarter circles in the first graph.

3. The method of claim 2 comprising:
providing, on the computer screen, a scroll-in control for the user to scroll the first graph in; and
after the scroll-in control is selected, shifting the time segments represented by the quarter circles in the first graph backwards by collapsing the first portion of the histogram in the second graph back into the first graph,
wherein after the scroll-in control is selected, the first time segment is represented by the quarter circle having the size greater than all other quarter circles in the first graph, and the second time segment is represented by a quarter circle having a size one size smaller than the quarter circle representing the first time segment.

4. The method of claim 1 wherein each sector of a particular quarter circle comprises a radius that extends from a center to an edge of the particular quarter circle, each sector of the particular quarter circle thereby having a uniform length irrespective of a count of values recorded during a time unit represented by a sector of the particular quarter circle.

5. The method of claim 1 wherein each sector of a particular quarter circle comprises a central angle equal to a central angle of each other sector in the particular quarter circle.

6. The method of claim 1 comprising:
assigning a first color to a threshold count of values;
for each sector, determining whether a count of values recorded during a time unit represented by a sector exceeds the threshold count;
if the count exceeds the threshold count, showing the sector using the first color; and
if the count does not exceed the threshold count, showing the sector using a second color, different from the first color.

7. The method of claim 1 wherein increasing sizes of the quarter circles indicate a progression forwards through the time period.

8. A system for representing a histogram, the system comprising:
a processor-based system executed on a computer system and configured to:
obtain values used for the histogram, the values having been recorded during time units in a time period, the histogram comprising a plurality of bins, each bin corresponding to a time unit, and having a height proportional to a count of the values recorded during that time unit;
divide the time period into a plurality of time segments, each time segment thereby being associated with a respective subset of the plurality of bins; and
display, on a graphical user interface of a computer screen, a first graph comprising:
drawing an expanding spiral according to a golden ratio spiral;
defining a plurality of quarter circles using the expanding spiral, each quarter circle having an edge formed by a portion of the expanding spiral, and a center;
drawing, within a quarter circle, a plurality of sectors about the center, wherein the quarter circle represents a time segment, and the plurality of sectors within the quarter circle represent a plurality of bins associated with the time segment and thereby time units in the time segment; and
repeating the drawing a plurality of sectors for a next quarter circle representing a next time segment for at least some of the remaining time segments.

9. The system of claim 8 wherein the processor-based system is configured to:
provide, on the computer screen, a scroll-out control for a user to scroll the first graph out; and
after the scroll-out control is selected, shift time segments represented by the quarter circles in the first graph forwards by displaying in a second graph, adjacent to the first graph, a first portion of the histogram,
wherein the first portion of the histogram corresponds to a first time segment,
wherein prior to the scroll-out control being selected, the first time segment had been represented by a quarter circle having a size greater than all other quarter circles in the first graph, and wherein after the scroll-out control is selected, a second time segment occurring immediately before the first time segment is represented by the quarter circle having the size greater than all the other quarter circles in the first graph.

10. The system of claim 9 wherein the processor-based system is configured to:
provide, on the computer screen, a scroll-in control for the user to scroll the first graph in; and
after the scroll-in control is selected, shift the time segments represented by the quarter circles in the first graph backwards by collapsing the first portion of the histogram in the second graph back into the first graph,
wherein after the scroll-in control is selected, the first time segment is represented by the quarter circle having the size greater than all other quarter circles in the first graph, and the second time segment is represented by a quarter circle having a size one size smaller than the quarter circle representing the first time segment.

11. The system of claim 8 wherein each sector of a particular quarter circle comprises a radius that extends from a center to an edge of the particular quarter circle, each sector of the particular quarter circle thereby having a uniform length irrespective of a count of values recorded during a time unit represented by a sector of the particular quarter circle.

12. The system of claim 8 wherein each sector of a particular quarter circle comprises a central angle equal to a central angle of each other sector in the particular quarter circle.

13. The system of claim 8 wherein the processor-based system is configured to:
assign a first color to a threshold count of values;
for each sector, determine whether a count of values recorded during a time unit represented by a sector exceeds the threshold count;
if the count exceeds the threshold count, show the sector using the first color; and
if the count does not exceed the threshold count, show the sector using a second color, different from the first color.

14. The system of claim 8 wherein increasing sizes of the quarter circles indicate a progression forwards through the time period.

15. A computer program product, comprising a non-transitory computer-readable medium having a computer-readable program code embodied therein, the computer-readable program code adapted to be executed by one or more processors to implement a method comprising:
obtaining values used in a histogram, the values having been recorded during time units in a time period, the histogram comprising a plurality of bins, each bin corresponding to a time unit, and having a height proportional to a count of the values recorded during that time unit;
dividing the time period into a plurality of time segments, each time segment thereby being associated with a respective subset of the plurality of bins; and
displaying, on a graphical user interface of a computer screen, a first graph comprising:
drawing an expanding spiral according to a golden ratio spiral;
defining a plurality of quarter circles using the expanding spiral, each quarter circle having an edge formed by a portion of the expanding spiral, and a center;
drawing, within a quarter circle, a plurality of sectors about the center, wherein the quarter circle represents a time segment, and the plurality of sectors within the quarter circle represent a plurality of bins associated with the time segment and thereby time units in the time segment; and
repeating the drawing a plurality of sectors for a next quarter circle representing a next time segment for at least some of the remaining time segments.

16. The computer program product of claim 15 wherein the method comprises:
providing, on the computer screen, a scroll-out control for a user to scroll the first graph out; and
after the scroll-out control is selected, shifting time segments represented by the quarter circles in the first graph forwards by displaying in a second graph, adjacent to the first graph, a first portion of the histogram,
wherein the first portion of the histogram corresponds to a first time segment,
wherein prior to the scroll-out control being selected, the first time segment had been represented by a quarter circle having a size greater than all other quarter circles in the first graph, and
wherein after the scroll-out control is selected, a second time segment occurring immediately before the first time segment is represented by the quarter circle having the size greater than all the other quarter circles in the first graph.

17. The computer program product of claim 16 wherein the method comprises:
providing, on the computer screen, a scroll-in control for the user to scroll the first graph in; and
after the scroll-in control is selected, shifting the time segments represented by the quarter circles in the first graph backwards by collapsing the first portion of the histogram in the second graph back into the first graph,
wherein after the scroll-in control is selected, the first time segment is represented by the quarter circle having the size greater than all other quarter circles in the first graph, and the second time segment is represented by a quarter circle having a size one size smaller than the quarter circle representing the first time segment.

18. The computer program product of claim 15 wherein each sector of a particular quarter circle comprises a radius that extends from a center to an edge of the particular quarter circle, each sector of the particular quarter circle thereby having a uniform length irrespective of a count of values recorded during a time unit represented by a sector of the particular quarter circle.

19. The computer program product of claim 15 wherein the method comprises:
assigning a first color to a threshold count of values;
for each sector, determining whether a count of values recorded during a time unit represented by a sector exceeds the threshold count;
if the count exceeds the threshold count, showing the sector using the first color; and
if the count does not exceed the threshold count, showing the sector using a second color, different from the first color.

20. The computer program product of claim 15 wherein increasing sizes of the quarter circles indicate a progression forwards through the time period.

* * * * *